US008576230B2

(12) United States Patent  
Okano

(10) Patent No.: US 8,576,230 B2  
(45) Date of Patent: Nov. 5, 2013

(54) GRAPH DISPLAY APPARATUS, RECORDING MEDIUM ON WHICH PROGRAM IS RECORDED, AND GRAPH DISPLAY METHOD

(75) Inventor: Mitsuru Okano, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 250 days.

(21) Appl. No.: 13/029,516

(22) Filed: Feb. 17, 2011

(65) Prior Publication Data

US 2011/0234596 A1 Sep. 29, 2011

(30) Foreign Application Priority Data

Mar. 25, 2010 (JP) ................................ 2010-069349

(51) Int. Cl.  
*G06T 11/20* (2006.01)

(52) U.S. Cl.  
USPC .......................................................... 345/440

(58) Field of Classification Search  
USPC .......................................................... 345/440  
See application file for complete search history.

(56) References Cited

U.S. PATENT DOCUMENTS

| 5,825,001 | A | 10/1998 | Oba et al. | |
|---|---|---|---|---|
| 2004/0227738 | A1* | 11/2004 | Sudoh | 345/173 |
| 2007/0239808 | A1* | 10/2007 | Wostrel | 708/130 |
| 2008/0044086 | A1* | 2/2008 | Itoh et al. | 382/195 |
| 2011/0119256 | A1* | 5/2011 | Matsuda | 707/722 |

FOREIGN PATENT DOCUMENTS

| JP | 61-275959 A | 12/1986 |
|---|---|---|
| JP | 10-188009 A | 7/1998 |
| JP | 2002-153415 A | 5/2002 |
| JP | 2003-131655 A | 5/2003 |
| JP | 2003-281102 A | 10/2003 |
| JP | 2005-071147 A | 3/2005 |

OTHER PUBLICATIONS

Japanese Office Action dated Feb. 28, 2012, issued in counterpart Japanese Application No. 2010-069349, and English translation thereof.  
Japanese Office Action dated Oct. 4, 2011 (and English translation thereof) in counterpart Japanese Application No. 2010-069349.  
Extended European Search Report (EESR) dated Jan. 24, 2012 (in English) in counterpart European Application No. 11157172.5.

* cited by examiner

*Primary Examiner* — Aaron M Richer  
*Assistant Examiner* — Vu Nguyen  
(74) *Attorney, Agent, or Firm* — Holtz, Holtz, Goodman & Chick, PC

(57) ABSTRACT

A scientific electronic calculator includes a display unit which performs display by a plurality of dots and a CPU which displays X and Y axes on the display unit and displays scales on the X axis at predetermined scale intervals. The CPU displays a graph in a coordinate system determined by the X and Y axes moves the trace pointer on the graph dot by dot in an X-axis direction according to a user operation, and displays coordinate values of the trace pointer on the display unit, while displaying a trace pointer on the graph The CPU sets a numerical width of the X axis in such a way that a value obtained by dividing the numerical width of the X axis by a scale interval is one N-th of the number of dots in an X-axis direction, the N which is an integer, and displays the X axis.

6 Claims, 17 Drawing Sheets

| | X MINIMUM VALUE | X MAXIMUM VALUE | Y MINIMUM VALUE | Y MAXIMUM VALUE |
|---|---|---|---|---|
| -2 | -12.6 | 12.6 | -6.2 | 6.2 |
| -1 | -9.45 | 9.45 | -4.65 | 4.65 |
| 0 | -6.3 | 6.3 | -3.1 | 3.1 |
| 1 | -5.25 | 5.25 | -2.5833 | 2.5833 |
| 2 | -4.725 | 4.725 | -2.325 | 2.325 |
| 3 | -3.78 | 3.78 | -1.86 | 1.86 |

REDUCTION ↑
↓ MAGNIFICATION

| | X MINIMUM VALUE | X MAXIMUM VALUE | Y MINIMUM VALUE | Y MAXIMUM VALUE |
|---|---|---|---|---|
| -2 | -12.6 | 12.6 | -6.2 | 6.2 |
| -1 | -9.45 | 9.45 | -4.65 | 4.65 |
| 0 | -6.3 | 6.3 | -3.1 | 3.1 |
| 1 | -5.25 | 5.25 | -2.5833 | 2.5833 |
| 2 | -4.725 | 4.725 | -2.325 | 2.325 |
| 3 | -3.78 | 3.78 | -1.86 | 1.86 |

FIG. 4

| FILE NAME | IMAGE | X:MINIMUM/ MAXIMUM VALUE | Y:MINIMUM/ MAXIMUM VALUE | X:SCALE INTERVAL | Y:SCALE INTERVAL |
|---|---|---|---|---|---|
| BASKET.g3m |  | -1.0277 9.4722 | -0.4722 4.6944 | 0.5 | 1 |
| PARABORA.g3m |  | ⋮ | ⋮ | 2 | 1 |

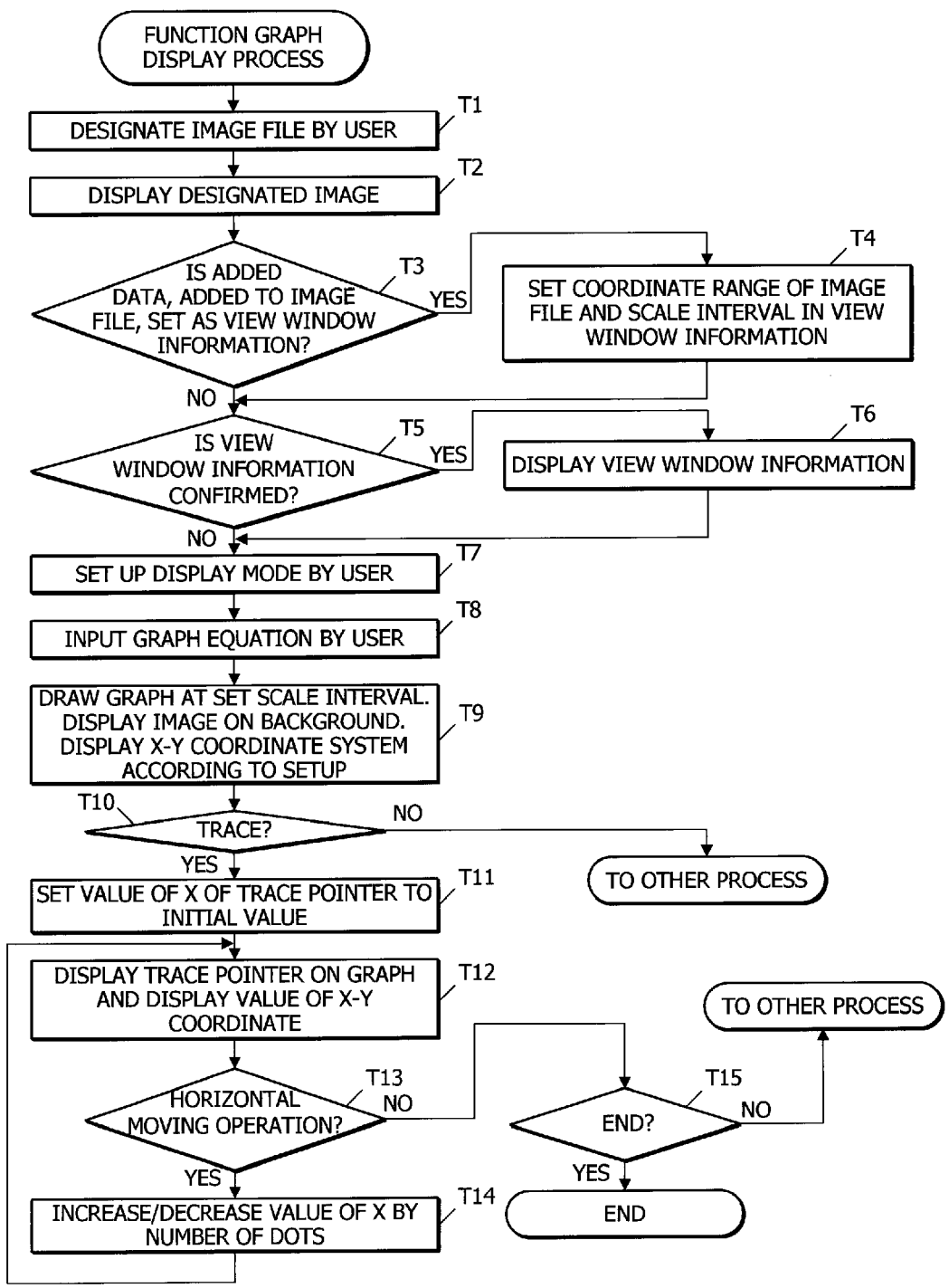

GRAPH DISPLAY APPARATUS, RECORDING MEDIUM ON WHICH PROGRAM IS RECORDED, AND GRAPH DISPLAY METHOD

BACKGROUND OF THE INVENTION

1. Field of the Invention

The present invention relates to a graph display apparatus which can display a trace pointer at an optional point on a graph and can display position coordinates of the trace pointer, a recording medium on which a program is recorded, and a graph display method.

2. Description of Related Art

In a conventional graph display apparatus which displays a graph of a function expression, a trace pointer can be displayed at an optional point on the graph, and position coordinates of the trace pointer can be displayed.

However, in such a conventional graph display apparatus, a numerical width (=the upper-limit value minus the lower-limit value) of a display range of each of coordinate axes and a scale interval of each of the coordinate axes are set independently of a dot interval of a display thereof. For this reason, when the trace pointer is moved to a scale corresponding position of an X axis to obtain a value of a Y axis thereof, an X-coordinate value of the trace pointer cannot be matched with a scale value, and the value of the Y axis thereof may not be correctly obtained.

SUMMARY OF THE INVENTION

An object of the present invention is to more accurately match a coordinate of a trace pointer with a scale value.

In order to achieve at least the above object, according to an aspect of the present invention, a graph display apparatus includes:
- a display unit which performs display by a plurality of dots;
- a coordinate axis display control unit which displays a plurality of coordinate axes on the display unit and displays scales at a predetermined scale interval on a predetermined coordinate axis of the coordinate axes, and when a value obtained by subtracting a lower-limit value from an upper-limit value of a display range of each of the coordinate axes is defined as a numerical width of each of the coordinate axes, sets the numerical width of the predetermined coordinate axis in such a way that a value obtained by dividing the numerical width of the predetermined coordinate axis by the scale interval is one N-th of a number of dots in an axis direction of the predetermined coordinate axis, the N which is an integer, and displays the predetermined coordinate axis;
- a graph display control unit which displays a graph in a coordinate system determined by the coordinate axes; and
- a trace control unit which moves a trace pointer on the graph for a predetermined number of dots in the axis direction of the predetermined coordinate axis according to a user operation and displays a coordinate value of the trace pointer on the display unit, while displaying a trace pointer on the graph.

According to the present invention, while a trace pointer is displayed on a graph of a coordinate system determined by the of coordinate axes, the trace pointer is moved on the graph according to a user operation, and coordinate values of the trace pointer are displayed. For this reason, the trace pointer is displayed at an optional point on the graph to make it possible to display position coordinates of the trace pointer. Scales are displayed on the predetermined coordinate axis on the coordinate system at predetermined scale intervals, the trace pointer is designed to move on the graph for a predetermined number of dots in an axis direction of the predetermined coordinate axis according to a user operation, and a numerical width of the predetermined coordinate axis is set in such a way that a value obtained by dividing the numerical width of the predetermined coordinate axis by the scale interval is one N-th of a number of dots in an axis direction of the predetermined coordinate axis, the N which is an integer. In this manner, the coordinate axis is displayed. For this reason, each of the scales can be displayed by an integer number of dots in the axis direction of the coordinate axis. Consequently, the coordinate values of the trace pointer can be more accurately matched with a scale value. Therefore, with respect to the predetermined coordinate axis, the coordinate values of the trace pointer are matched with the scale, so that a correct value on another coordinate axis can be obtained.

BRIEF DESCRIPTION OF THE DRAWINGS

FIGS. 3A and 3B are diagrams showing a coordinate range storing table;

FIG. 4 is a diagram showing a data structure of an image file;

FIG. 7 is a flowchart showing a flow of a function graph display process;

DETAILED DESCRIPTION OF PREFERRED EMBODIMENTS

An example of an embodiment according to the present invention will be described below in detail with reference to the accompanying drawings. The scope of the invention is not limited to the illustrated examples.

[1. Configuration of Graph Display System]

Figure 1:
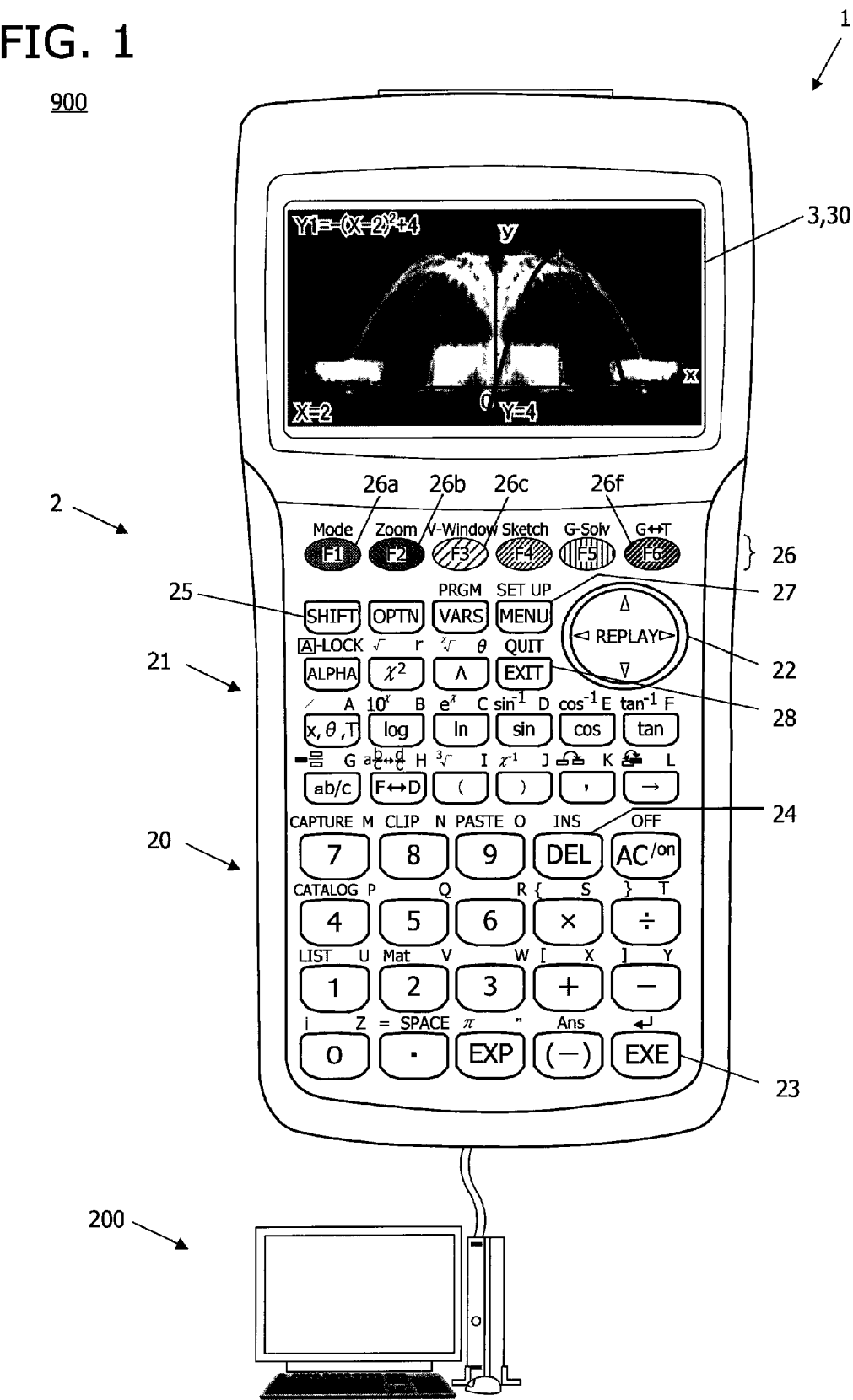
FIG. 1 is a plan view showing a schematic configuration of a graph display system.

FIG. 1 is a conceptual diagram showing a schematic configuration of a graph display system 900.

As shown in FIG. 1, the graph display system 900 includes a personal computer 200 and a scientific electronic calculator 1.

[1-1. Configuration of Personal Computer]

The personal computer 200 will be described first.

Figure 2:
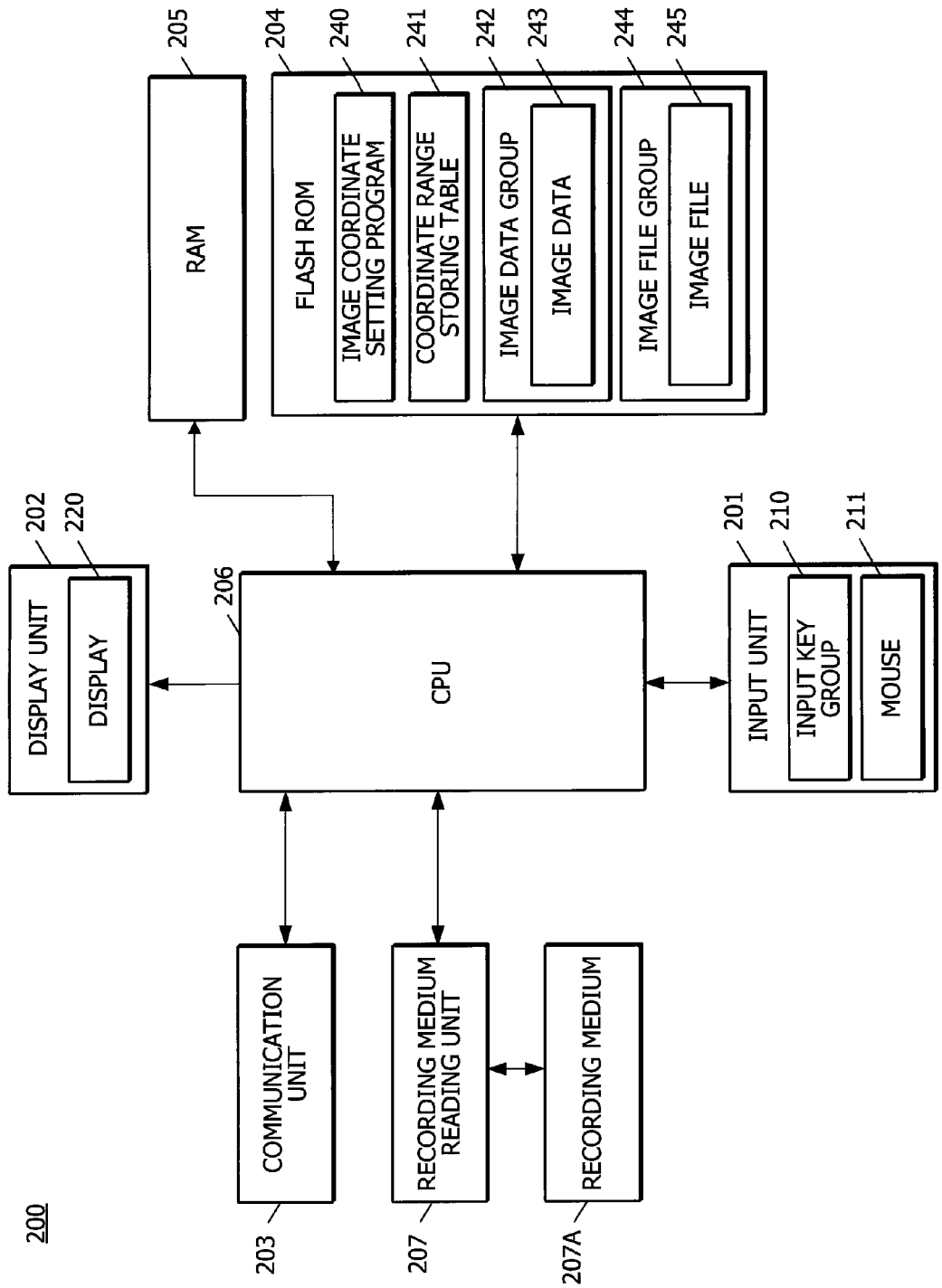
FIG. 2 is a block diagram showing a functional configuration of a personal computer.

FIG. 2 is a block diagram showing a schematic configuration of the personal computer 200.

As shown in FIG. 2, the personal computer 200 includes functional units such as an input unit 201, a display unit 202, a communication unit 203, a recording medium reading unit 207, a flash ROM (Read Only Memory) 204, a RAM (Random Access Memory) 205, and a CPU (Central Processing Unit) 206. The functional units are connected to each other with a bus.

The input unit 201 includes an input key group 210 and a mouse 211, so that a signal input through the input key group 210 or the mouse 211 is output to the CPU 206. The mouse 211 in this embodiment cooperates with the display unit 202 to receive a numerical expression inputting operation or the like by using a GUI (Graphical User Interface).

The display unit 202 includes a display 220 to display various pieces of information on the display 220 based on a signal from the CPU 206. The display 220 is explained as the one configured by a dot matrix liquid crystal. However, another display device using, for example, a TFT (Thin Film Transistor) liquid crystal or a PDP (Plasma Display Panel) may be used as a matter of course.

The communication unit 203 is to perform data communication with the scientific electronic calculator 1. The communication may be performed with a wireless system or a cable.

The recording medium reading unit 207 is to read information from a recording medium 207A such as a USB memory which is detachably attached to the personal computer.

The flash ROM 204 stores various programs according to operations related to a menu display process, various setting processes, and various arithmetic processes in the personal computer 200 or programs or the like to realize various functions included in the personal computer 200. In this embodiment, the flash ROM 204 stores an image coordinate setting program 240, a coordinate range storing table 241, an image data group 242, and an image file group 244.

The image coordinate setting program 240 is a program to cause the CPU 206 to execute an image coordinate range setting process (described later) (see FIG. 6).

The coordinate range storing table 241, as shown in FIG. 3A, stores a plurality of combinations of default upper-limit values and default lower-limit values in an X-axis direction and a Y-axis direction when an X-Y coordinate system determined by X and Y axes displayed on the scientific electronic calculator 1 is reduced and magnified in a stepwise manner. In this case, a numerical width of the X axis (=upper-limit value minus lower-limit value in a display range of the X axis) obtained by the combinations is one N-th (here, the N is an integer) of the number of dots in the X-axis direction on a display 3 (described later) of the scientific electronic calculator 1, so that a space between the scales about the integer values can be expressed by an integer number of dots. For example, a numerical width "25.2" (12.6–(–12.6)) of the X axis obtained by a first combination is one fifteenth of the number "378" of dots in the X-axis direction of the display 3 in this embodiment, so that the scale interval of the integer values can be expressed by 15 dots. Similarly, a second numerical width "18.9" (=9.45–(–9.45)) is one twentieth of the number "378" of dots, a third numerical width "12.6" (=6.3–(–6.3)) is one thirtieth of the number "378" of dots, a fourth numerical width "10.5" (=5.25–(–5.25)) is one thirty-sixth of the number "378" of dots, a fifth numerical width "9.45" (=4.725–(–4.725)) is one fortieth of the number "378" of dots, and a sixth numerical width "7.56" (=3.78–(–3.78)) is one fiftieth of the number "378" of dots. In the drawing, numerical values in a left-end column denote reduction and magnification steps. For example, "0" denotes a state in which magnification/reduction is not performed, "1" denotes a state in which 1-step magnification is performed, and "–1" denotes a state in which 1-step reduction is performed.

Figure 11A:
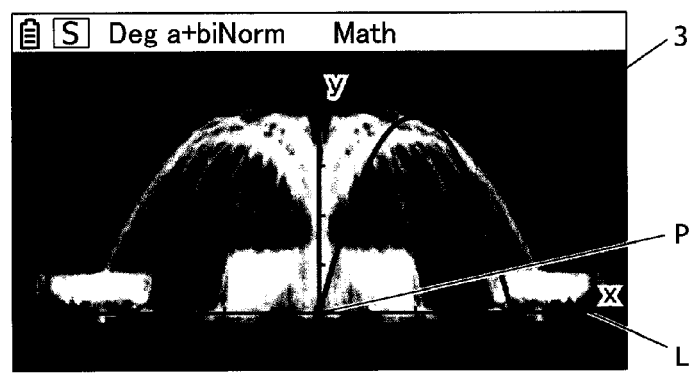
FIGS. 11A to 11D are diagrams showing display contents of the display.

The image data group 242 stores a plurality of image data 243 about an image displayed on a coordinate system in piles on the scientific electronic calculator 1. The image of the image data 243 in this embodiment, for example, as shown in FIG. 11A (described later) has a line (referred to as a reference line L hereinafter) serving as a reference when a graph is drawn on the image and extending in a horizontal direction (in other words, right-and-left direction). Furthermore, a point (referred to as a reference point P hereinafter) serving as a reference when a graph is drawn is formed on the reference line L.

The image file group 244 stores a plurality of image files 245. The image files 245, as shown in FIG. 4, have the image data 243 and additional data 246.

The additional data 246 shows a display range (maximum and minimum coordinate values of X and Y; i.e., Xmin, Xmax, Ymin, and Ymax) of a coordinate system to correspond to the image of the image data 243 and scale intervals of the coordinate axes. In the additional data 246 in this embodiment, by an image coordinate range setting process (see FIG. 6) (described later), a display range of the coordinate system is set in such a way that the reference line L of the image is matched with the X axis when the image of the image data 243 is superposed on the X-Y coordinate system and the reference point P of the image is matched with an origin of the coordinate system (see FIG. 11A).

The RAM 205 is an as-needed writable memory which temporarily holds various programs executed by the CPU 206, data related to the execution of the programs, and the like.

The CPU 206 reads a predetermined program from the flash ROM 204 based on an input instruction, temporarily stores the program in the RAM 205, and executes various processes based on the program to intensively control the units of the personal computer 200. More specifically, the CPU 206 executes the various processes based on the read predetermined program, stores the process results in a work area in the RAM 205, and displays the process results on the display unit 202.

[1-2. Configuration of Scientific Electronic Calculator]

[1-2-1. Outside Configuration]

The scientific electronic calculator 1 will be described next.

As shown in FIG. 1 described above, the scientific electronic calculator 1 includes an input key group 2 having various key groups and the display 3.

The input key group 2 is a key group to receive an input operation of a numerical expression element such as a numerical value or an arithmetic operation symbol from a user or to receive instruction operations of various processes, and has a plurality of keys to which unique functions are allocated. In this embodiment, the input key group 2 includes a numerical keypad 20, arithmetic operation symbol keys 21, a cursor key 22, an EXE key 23, a delete key 24, a shift key 25, function keys 26, a menu key 27, an EXIT key 28, and the like.

Of the keys, the numerical keypad 20 includes keys to receive an input operation of a numerical value. The arithmetic operation symbol keys 21 include keys to receive input operations of various arithmetic operation symbols such as symbols for four arithmetic operations, parentheses, a vinculum of a fractional number, a root (√), a logarithmic symbol, a constant (circumference ratio "π", a light velocity "c", or the like), and a trigonometric function symbol.

The cursor key 22 is a key depressed when a cursor indicating a position to be edited or a position to be selected in the display 3 is moved in a predetermined direction. In this embodiment, the cursor key 22 is designed to be able to input four directions, i.e., upper, lower, left, and right directions.

The EXE key 23 is a key to receive an input operation of a process executing instruction or a process determining instruction. For example, the EXE key 23 is designed to function as a key which instructs execution of an arithmetic process after a numerical expression is input. The delete key 24 is a key to receive a deleting operation for a numerical value, an arithmetic operation symbol, or the like displayed on the display 3. The shift key 25 is a key depressed in combination with another key when functions of the various keys are switched.

The function keys 26 include a plurality of keys to receive an execution instruction for a predetermined process. In this embodiment, the function keys 26 include 6 keys 26a to 26f "F1" to "F6". Of the keys, the "F1" key 26a is a key operated when a graph is instructed to be traced in a function graph display process (see FIG. 7) (described later). The "F2" key 26b is a key operated when a display range of a coordinate system displayed on the display 3 is magnified or reduced. The "F3" key 26c is a key operated when view window information is set or confirmed. The "F6" key 26f is a key operated when display contents on the display 3 are switched between a graph and a graph equation or a data table of the graph. The view window information mentioned here is information showing a display mode of the X-Y coordinate system. In this embodiment, the view window information includes a display range (maximum and minimum coordinate values of X and Y; i.e., Xmin, Xmax, Ymin, and Ymax) of the X-Y coordinate system, scale intervals (Xscl and Yscl) of the coordinate axes, and a dot interval (Xdot) in the X-axis direction in a graph display. The dot interval (X dot) in the X-axis direction is a numerical value on the X axis corresponding to a dot pitch in a horizontal direction (X-axis direction) when the X axis is horizontally full-screen-displayed on the display 3 as well as a value obtained by dividing a numerical width (Xmax−Xmin) of the X axis by the number of dots in the X-axis direction on the display 3. In a graph display, a value of Y of a graph equation is calculated in a dot interval unit from the X minimum coordinate value, plotted at a position of the coordinates in the display range, and displayed on the graph.

The menu key 27 is a key to call a menu to execute various functions in the scientific electronic calculator 1. The EXIT key 28 is a key depressed when the various processes in the scientific electronic calculator 1 are instructed to end.

The display 3 is configured by an LCD (Liquid Crystal Display), an ELD (Electronic Luminescent Display), or the like and designed to display not only a letter, a symbol, a numerical expression, an arithmetic result, or the like according to an operation of the input key group 2 or the like, but also various data required to use the scientific electronic calculator 1 with a plurality of dots. On the display 3 according to this embodiment, the X axis is horizontally displayed, and the Y axis is vertically displayed, so that an X-Y coordinate system is displayed by the X and Y axes. The number of dots in the X-axis direction is "378". On the display 3 according to this embodiment, a touch panel 30 is integrally set over the entire display screen.

[1-2-2. Functional Configuration]

A functional configuration of the scientific electronic calculator 1 will be described below.

Figure 5:
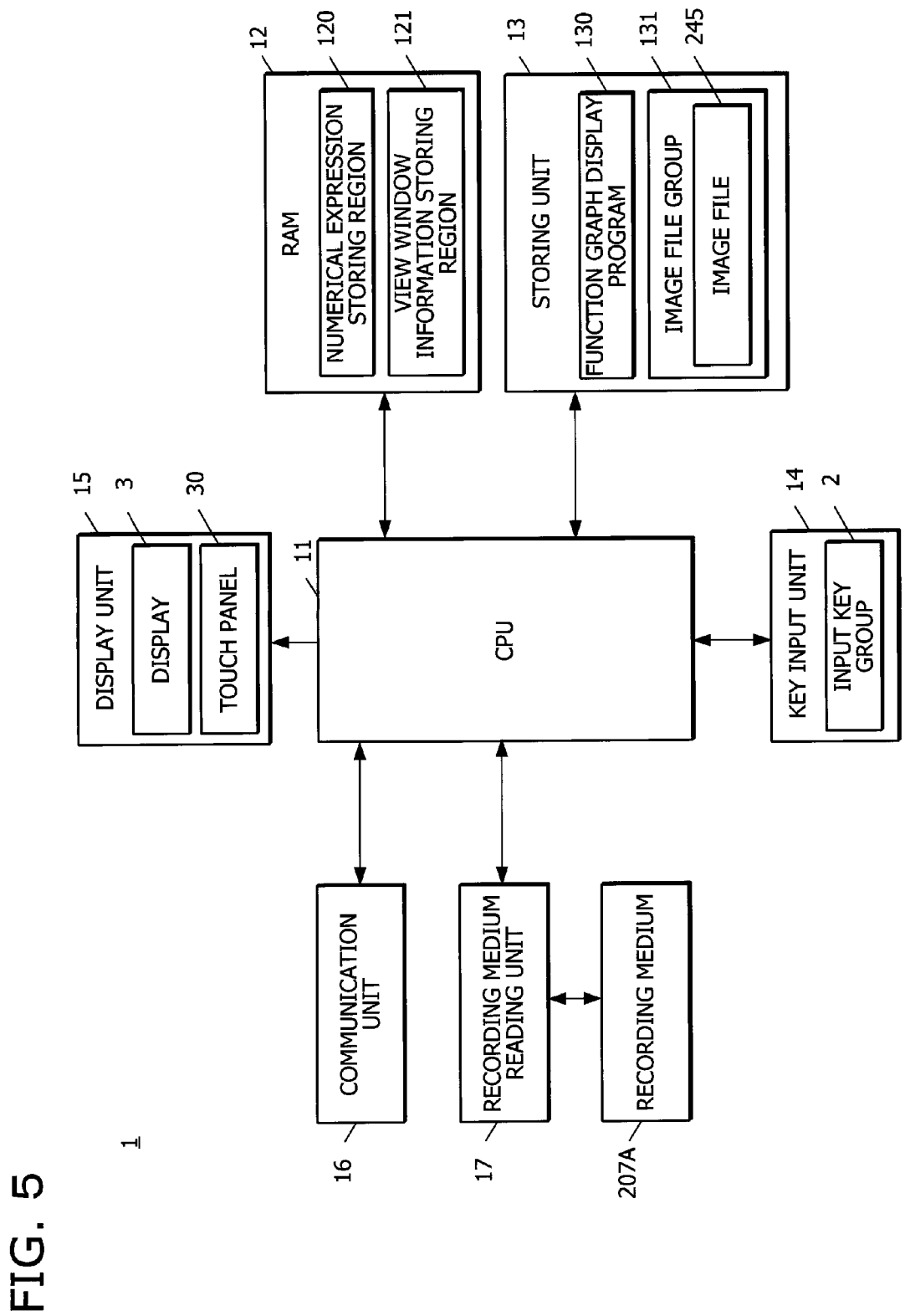
FIG. 5 is a block diagram showing a functional configuration of a scientific electronic calculator.

FIG. 5 is a block diagram showing a schematic functional configuration of the scientific electronic calculator 1.

As shown in FIG. 5, the scientific electronic calculator 1 includes a key input unit 14, a display unit 15, a communication unit 16, a recording medium reading unit 17, a RAM (Random Access Memory) 12, a storing unit 13, and a CPU (Central Processing Unit) 11.

The key input unit 14 includes the above input key group 2 to output an operation signal corresponding to a depressed key to the CPU 11.

The display unit 15 includes the display 3 described above to display various pieces of information on the display 3 according to a display signal from the CPU 11. The display unit 15 includes the touch panel 30 set integrally with the display 3 to output contact position information of an input pen to the display screen to the CPU 11.

The communication unit 16 performs data communication with the communication unit 203 in the personal computer 200. The communication unit 16 according to this embodiment receives the image file 245 from the personal computer 200 and stores the image file 245 in the storing unit 13.

The recording medium reading unit 17 reads information from the recording medium 207A such as a USB memory detachably attached to the personal computer.

The RAM 12 is a volatile memory which temporarily stores information and has a plurality of work areas which store various programs to be executed and data or the like related to the various programs. For example, the RAM 12 according to this embodiment is designed to have a numerical expression storing region 120, a view window information storing region 121, and the like as the work areas.

In the numerical expression storing region 120, a graph equation input in a function graph display process described later (see FIG. 7) is stored.

In the view window information storing region 121, view window information set in the function graph display process described later (see FIG. 7) is stored. In this embodiment, as default values, a X-axis display range "Xmin: −6.3, Xmax: 6.3", a scale interval "Xscl: 1", a Y-axis display range "Ymin: −3.1, Ymax: 3.1", a scale interval "Yscl: 1", and a dot interval "X dot: 0.033 . . ." (=(6.3−(−6.3))/378) in the X-axis direction are stored.

The X-axis numerical width "12.6" (=Xmax−Xmin=6.3−(−6.3)) of the default values is one N-th (here, the N is an integer) of the number "378" of dots in the X-axis direction on the display 3, so that a space between scales about the numerical values can be expressed by a plurality of dots.

The storing unit 13 is a nonvolatile memory constituted by a ROM (Read Only Memory) or the like, and stores various programs and various data. More specifically, the storing unit 13 stores a function graph display program 130 serving as a program according to the present invention and an image file group 131.

The function graph display program 130 is a program to cause the CPU 11 to execute a function graph display process described later (see FIG. 7).

The image file group 131 stores the plurality of image files 245 transmitted from the personal computer 200 through the communication unit 16.

The CPU 11 centrally controls the units of the scientific electronic calculator 1. Specifically, the CPU 11 develops a program designated from among system programs and various application programs stored in the storing unit 13 in the RAM 12, and cooperates with the program developed in the RAM 12 to execute various processes.

[2. Operation of Graph Display System]

[2-1. Operation of Personal Computer]

An operation of the personal computer 200 will be described below.

Figure 6:
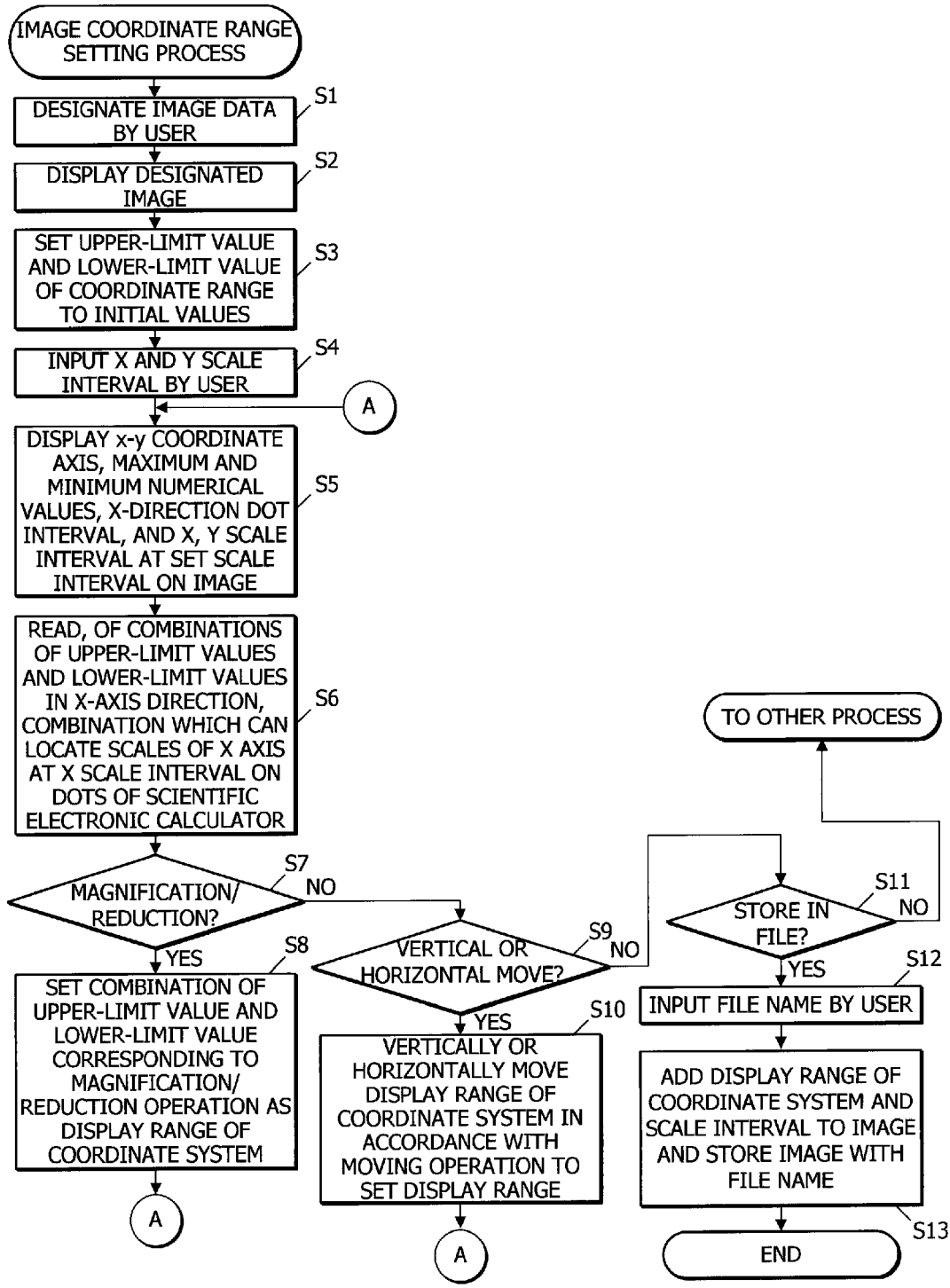
FIG. 6 is a flowchart showing a flow of an image coordinate range setting process.

FIG. 6 is a flowchart for explaining an operation of an image coordinate range setting process executed in the personal computer 200. When an execution instruction of the image coordinate range setting process is input by a user through the input unit 201, the image coordinate setting program 240 is read from the flash ROM 204 and appropriately developed in the RAM 205. As a result, the image coordinate range setting process is executed by a cooperation between the image coordinate setting program 240 and the CPU 206.

As shown in the drawing, in the image coordinate range setting process, when the user designates some image data 243 in the image data group 242 as designated image data (referred to as designated image data 243S hereinafter) (step S1), the CPU 206 displays an image of the designated image data 243S on the display 220 (step S2).

The CPU 206 then sets upper-limit values and lower-limit values of coordinate axes to be displayed, i.e., display ranges of a coordinate system (maximum and minimum coordinate values of X and Y: Xmin, Xmax, Ymin, and Ymax) as default values (step S3). In this embodiment, the CPU 206 in step S3, based on information in a coordinate range storing table 214, sets the lower-limit value and the upper-limit value of the X axis to "Xmin: −3.1" and "Xmax: 3.1" and the lower-limit value and the upper-limit value of the Y axis to "Ymin: −6.3" and "Ymax: 6.3".

When the user inputs the scale intervals (Xscl and Yscl) of the X axis and the Y axis (step S4), the CPU 206 displays X and Y axes on an image of the designated image data 243S in a display range set at present, displays scales on the coordinate axes at the scale intervals input in step S4, and displays X-axis values and Y-axis values (X-axis values at horizontal ends of the image and Y-axis values at vertical ends of the image) and the scale intervals in an external region of the image (step S5). At this time, the CPU 206 divides a numerical width (Xmax−Xmin) of the X axis by the number of dots in the X-axis direction on the display 3 to calculate a dot interval in the X-axis direction and displays the dot interval in the external region of the image.

The CPU 206 reads, of the combinations (Xmin, Xmax, Ymin, and Ymax) of the upper-limit values and the lower-limit values in the coordinate range storing table 241, a combination in which the scales of the X axis can be located on the dots of the display 3 at the scale intervals (Xscl) input in step S4, i.e., a combination in which each space between the scales of the X axis at the scale intervals (Xscl) input in step S4 can be expressed by an integer number of dots (step S6). More specifically, at this time, when a value obtained by dividing the numerical width (Xmax−Xmin) of the X axis by the scale interval (Xscl) is one N-th (here, the N is an integer) of the number of dots in the X-axis direction on the display 3, the CPU 206 determines that each of the spaces between the scales can be expressed by an integer number of dots.

Specifically, for example, when the scale interval (Xscl) in the X axis is set to "0.2", as shown in FIG. 3B, a value "52.5" (=10.5/0.2) obtained by dividing a third numerical width from the bottom "10.5" (=5.25−(−5.25)) of the X axis by the scale interval "0.2" is not one N-th (here, the N is an integer) of the number "378" of dots in the X-axis direction on the display 3. For this reason, it is determined that each of the space between the scales cannot be expressed by an integer number of dots. As a result, each of the spaces between the scales is not read from the coordinate range storing table 241.

The CPU 206 determines whether a zooming operation is performed by a user (step S7). When it is determined that the zooming operation is performed (step S7; Yes), the CPU 206, while displaying the image of the designated image data 243S on the display 220, sets, of the combinations (Xmin, Xmax, Ymin, and Ymax) of the upper-limit values and the lower-limit values of the X and Y axes read in step S6, a combination of an upper-limit value and a lower-limit value corresponding to the zooming operation as a display range of the coordinate system again (step S8), and then shifts to step S5 described above.

When it is determined in step S7 that the zooming operation is not performed (step S7; No), the CPU 206 determines whether vertical and horizontal moving operations are performed by the user (step S9).

When it is determined in step S9 that the moving operation is performed (step S9; Yes), the CPU 206 moves a display range of the X-Y coordinate system in a designated direction by the moving operation and sets a display range (Xmin, Xmax, Ymin, and Ymax) of the coordinate system again (step S10), and then shifts to step S5.

When it is determined in step S9 that the moving operation is not performed (step S9; No), the CPU 206 determines whether a storing operation is performed by the user (step S11). When it is determined that the moving operation is not performed (step S11; No), the CPU 206 shifts to another process.

When it is determined in step S11 that the storing operation is performed (step S11; Yes), after the CPU 206 causes the user to input a file name (step S12), the CPU 206 adds a display range (maximum and minimum coordinate values of X and Y; Xmin, Xmax, Ymin, and Ymax) of the coordinate system and the scale intervals (Xscl and Yscl) to the designated image data 243S as the additional data 246 to form the image files 245, stores the image files 245 in the flash ROM 204 in association with the input file name (step S13), and ends the image coordinate range setting process.

[2-2. Operation of Scientific Electronic Calculator]

An operation of the scientific electronic calculator 1 will be described below.

FIG. 7 is a flowchart for explaining an operation of a function graph display process. When an execution instruction of the function graph display process is input by a user through the touch panel 30 or the key input unit 14, the function graph display program 130 is read from the storing unit 13 and appropriately developed in the RAM 12. As a result, the function graph display process is executed by a cooperation between the function graph display program 130 and the CPU 11.

As shown in the drawing, in the function graph display process, when the user designates an image file 245 of the image files 245 in the image file group 131 as a background image of a coordinate system (step T1), the CPU 11 displays an image of the designated image file 245 on the display 3 (step T2).

The CPU 11 determines whether an operation of setting the additional data 246 added to the image file 245 as view window information (step T3). When it is determined that the operation is not performed (step T3; No), the CPU 11 maintains the view window information without changing the view window information from the default value in the view window information storing region 121 to shift to step T5 described later.

When it is determined in step T3 that the operation of setting the additional data 246 as the view window information is performed (step T3; Yes), the CPU 11 sets contents of the additional data 246 added to the image file 245, a display range (maximum and minimum coordinate values of X and Y; Xmin, Xmax, Ymin, and Ymax) of the coordinate system and scale intervals (Xscl and Yscl), and a dot interval in the X-axis direction calculated from the contents as the view window information to update information in the view window information storing region 121 (step T4).

Then, the CPU 11 determines whether an operation of confirming the view window information is performed (step T5). When it is determined that the operation is not performed (step T5; No), the CPU 11 shifts to step T7 described later. In this embodiment, a display instructing operation of the view window information is performed through the "F3" key 26c.

When it is determined in step T5 that the operation of confirming the view window information is performed (step T5; Yes), the CPU 11 displays the view window information in the view window information storing region 121 on the display 3 (step T6).

The CPU 11 causes the user to set up a display mode (step T7). In this case, in step T7, the user can perform settings to make it possible to set "Axes" (X and Y axes) to any one of "on" (coordinate axes are displayed), "off" (coordinate axes are not displayed), and "scale" (coordinate axes are displayed with scale values) and set "Label" (coordinate axis name and origin position "0" of the X and Y axes) to any one of "on" (displayed) and "off" (not displayed), and set "Grid" (grid) to any one of "on" (grid point is displayed), "off" (grid is not displayed), and "line" (grid line is displayed). However, this embodiment is explained on the assumption that "Axes" (X and Y axes) is set to any one of "on" (coordinate axes are displayed) or "scale" (coordinate axes are displayed with scale values).

After the CPU 11 causes the user to input a graph equation (step T8), the CPU 11 displays the view window information in the view window information storing region 121 and the X and Y axes and the scales of the axes based on the set-up contents of the display mode while displaying the image of the image file 245 designated in step T1 described above, and displays the graph of the graph equation in an X-Y coordinate system determined by the X and Y axes (step T9). For example, when "Axes" is set to "scale" in the setup of the display mode, in step T9, the CPU 11 displays the X and Y axes and displays, on the X and Y axes, scales and scale values at the scale intervals (Xscl and Yscl) of the view window information.

In this case, in the view window information, since a numerical width of the X axis is set in such a way that a value obtained by dividing the numerical width (Xmax−Xmin) of the X axis by the scale interval (Xscl) is one N-th (here, the N is an integer) of the number of dots in the X-axis direction, the scales of the X axis are located on the dots of the display 3. In the additional data 246 added to the image files 245, when the image of the image data 243 is superposed on the X-Y coordinate system, the display range (maximum and minimum coordinate values of X and Y; Xmin, Xmax, Ymin, and Ymax) of the coordinate system is set in such a way that a reference line L of the image is matched with the X axis and a reference point P of the image is matched with the origin of the coordinate system. For this reason, when the contents of the additional data 246 are set as the view window information in step T4 described above, in the X-Y coordinate system which is superposed on the image of the image data 243, the reference line L is matched with the X axis, and the reference point P is matched with the origin.

The CPU 11 then determines whether an operation of tracing a point on the graph is performed (step T10). When it is determined that the operation is not performed (step T10; No), the CPU 11 shifts to another process. In this embodiment, instruction of a trace is performed through the "F1" key 26a.

When it is determined in step T10 that the operation of designating a trace is performed (step T10; Yes), the CPU 11 sets an X-coordinate value about a trace pointer T (see FIG. 11C) to be displayed to a predetermined initial value (for example, "0") (step T11).

The CPU 11 then displays the trace pointer T at a corresponding point of the X-coordinate value set at present of the points on the graph, and displays the X and Y coordinates of the trace pointer T on a lower part of the display 3 (step T12).

The CPU 11 then determines whether a horizontal moving operation to the trace pointer T is performed (step T13). When it is determined that the operation is performed (step T13; Yes), the CPU 11 increases or decreases the X-coordinate value of the trace pointer T in a direction designated by the operation by a predetermined number of dots ("1" in this embodiment) (step T14), and then shifts to step T12 described above.

When it is determined in step T13 that the horizontal moving operation to the trace pointer T is not performed (step T13; No), the CPU 11 determines whether an ending operation is performed (step T15).

When it is determined that the ending operation is not performed (step T15; No), the CPU 11 shifts to another process. On the other hand, when it is determined that the ending operation is performed (step T15; Yes), the CPU 11 ends the function graph display process.

[1.4 Operations]

The operations in the personal computer 200 and the scientific electronic calculator 1 will be specifically described below with reference to the drawings.

(Operation 1)

Figure 8A:
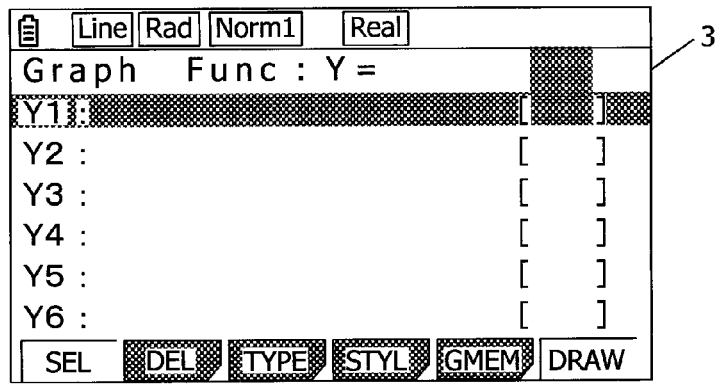
FIGS. 8A to 8D are diagrams showing display contents of a display.
Figure 8B:
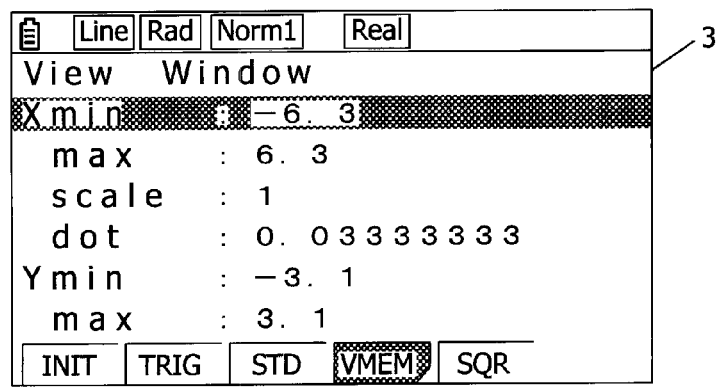
Figure 8C:
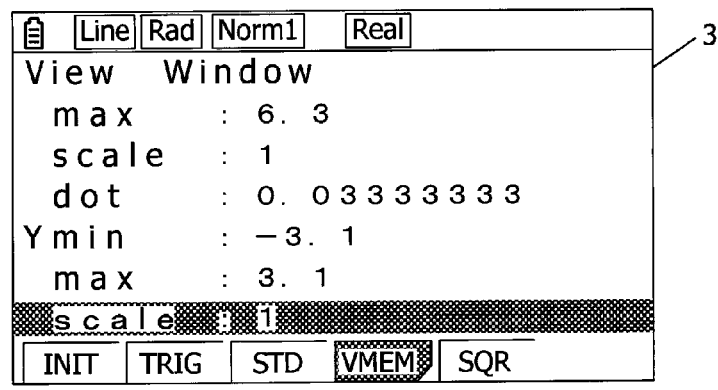
Figure 8D:
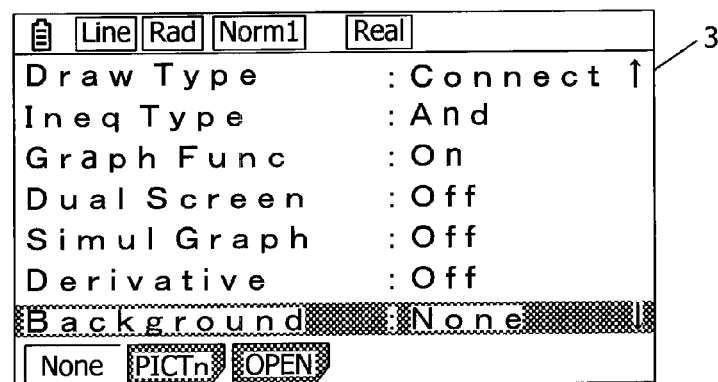
Figure 9A:
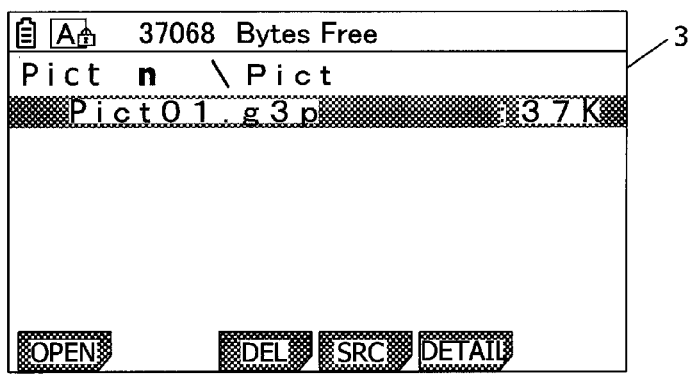
FIGS. 9A to 9D are diagrams showing display contents of the display.
Figure 9B:
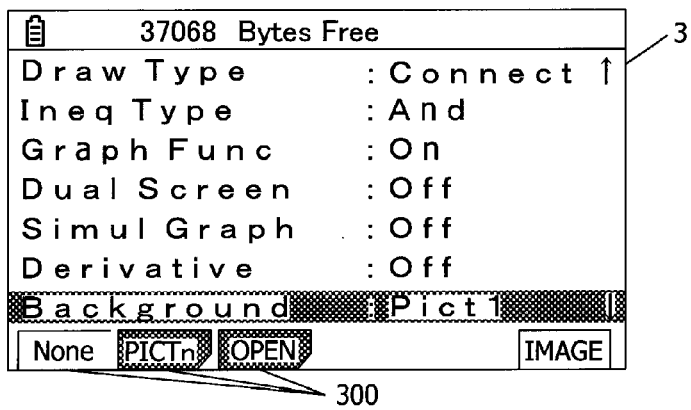
Figure 9C:
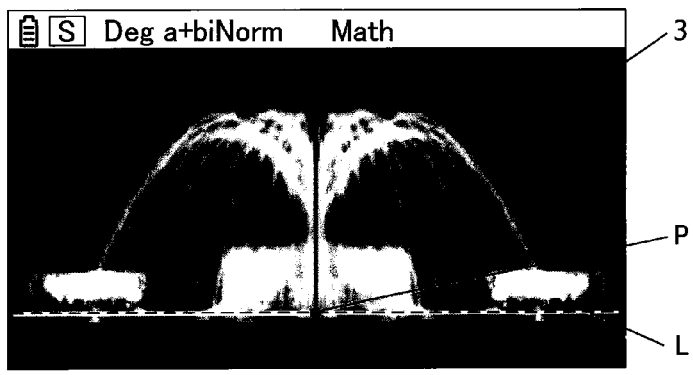

As shown in FIGS. 8A to 8C, in the scientific electronic calculator 1 which is in an initial state (no graph equation is input (see FIG. 8A), and the view window information is set to a default value (see FIGS. 8B and 8C)), when a user designates the image file 245 of "Pict01" as a background image (step T1) as shown in FIG. 8D and FIGS. 9A to 9C, the image of the image files 245 is displayed on the display 3 (step T2). FIG. 8D shows a state in which a background image setting item "background" of the coordinate system is selected from the set-up menu. On the lower part of the display 3, selection keys 300 for "None" (no background), "PICTn" (image designated by an image number is displayed), and "OPEN" (image read from the image file is displayed) is displayed as software keys. FIG. 9A shows a state in which "PICTn" is selected in the state shown in FIG. 8D, so that the image file 245 of each image number can be selected. As shown in FIG. 9C, in this operation, the image file 245 of "Pict01" is a file about an image obtained by photographing a fountain from the side. In this image, a water level is defined as the reference line L, and a spouting position of the fountain is defined as the reference point P.

Figure 9D:
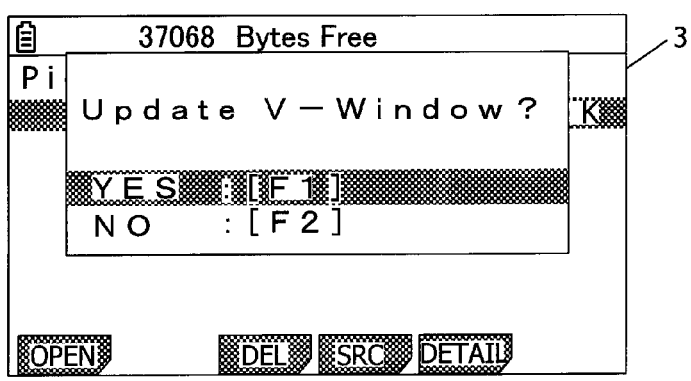
Figure 10A:
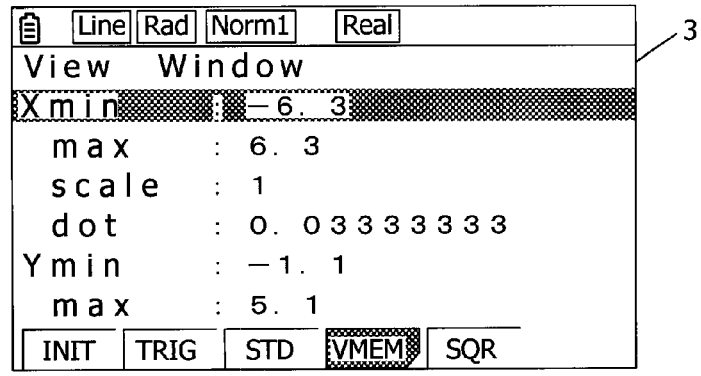
FIGS. 10A to 10D are diagrams showing display contents of the display.
Figure 10B:
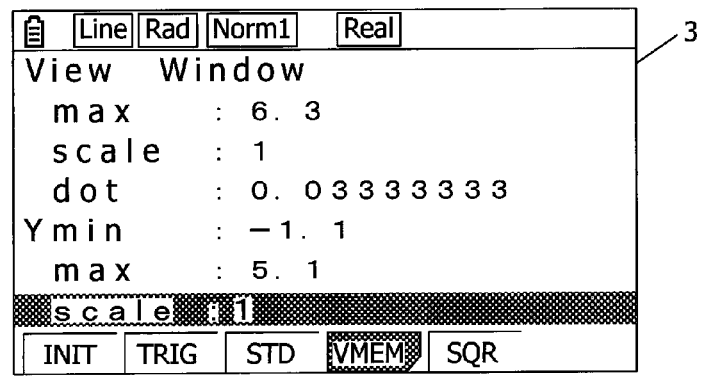

As shown in FIG. 9D, when the user performs an operation of setting the additional data 246 added to the image file 245 as the view window information (step T3; Yes), as shown in FIGS. 10A and 10B, the contents of the additional data 246 added to the image file 245, i.e., the display range ("Xmin: −6.3", "Xmax: 6.3", "Ymin: −1.1", and "Ymax: 5.1") of the coordinate system, the scale interval ("Xscl: 1" and "Yscl: 1"), and the dot interval "0.033, . . . " in the X direction calculated from these values are set as the view window information, and the information in the view window information storing region 121 is updated (step T4).

Figure 10C:
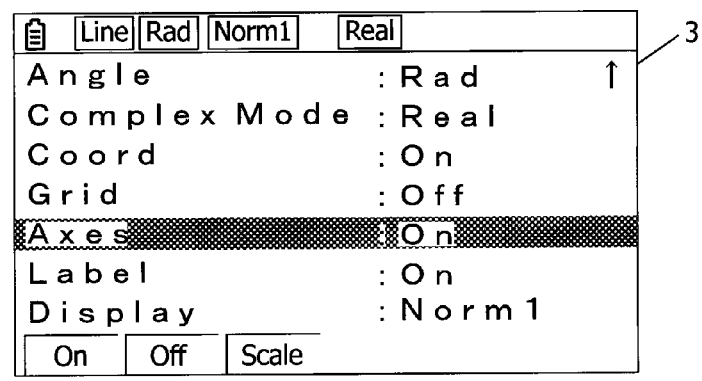
Figure 10D:
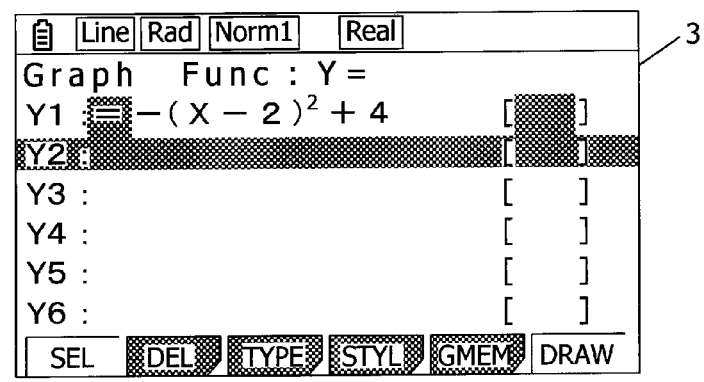

As shown in FIGS. 10C and 10D, the user sets up the display mode in such a way that "Axes" (X and Y axes) is set to "on" (coordinate axes are displayed), "Label" (coordinate axis names of the X and Y axes and "0" of the origin position) is set to "on" (displayed), and "Grid" (grid) is set to "off" (grid is not displayed) (step T7).

Figure 11B:
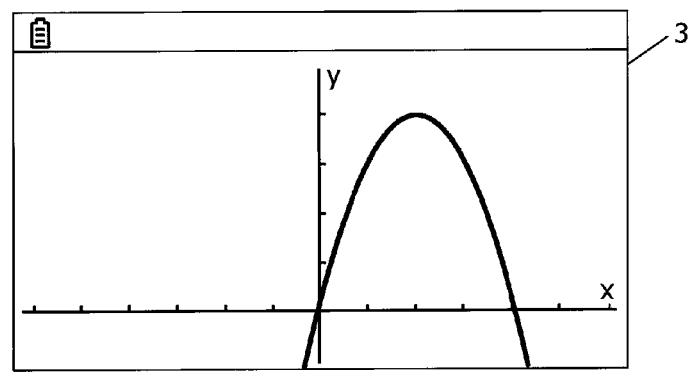

At this time, when a graph equation "Y=−(X−2)2+4" is input (step T8), as shown in FIG. 11A, the image of the image file 245 is displayed on the background, the X and Y axes and scales of the axes are displayed based on the view window information in the view window information storing region 121 and the contents of the setup of the display mode, and a graph of the graph equation "Y=−(X−2)2+4" is displayed on the X-Y coordinate system determined by the X and Y axes (step T9). At this time, when the user operates the "F6" key 26f, as shown in FIG. 11B, the display contents on the display 3 are switched to only the graph.

In the view window information, since the numerical width "12.6" (=Xmax−Xmin=3.1−(−3.1)) of the X axis is set in such a way that a value obtained by dividing the numerical width (Xmax−Xmin) of the X axis by the scale interval "Xscl: 1" is one N-th (here, the N is an integer) of the number "378" of dots in the X-axis direction, the scales of the X axis are located on the dots of the display 3. Since a display range ("Xmin: −6.3", "Xmax: 6.3", "Ymin: −1.1", and "Ymax: 5.1") is set in such a way that the reference line L of the image of the image file 245 is matched with the X axis and the reference point P of the image is matched with the origin of the coordinate system, on the X-Y coordinate system which the image of the image data 243 is superposed on, the reference line L is matched with the X axis, and the reference point P is matched with the origin.

Figure 11C:
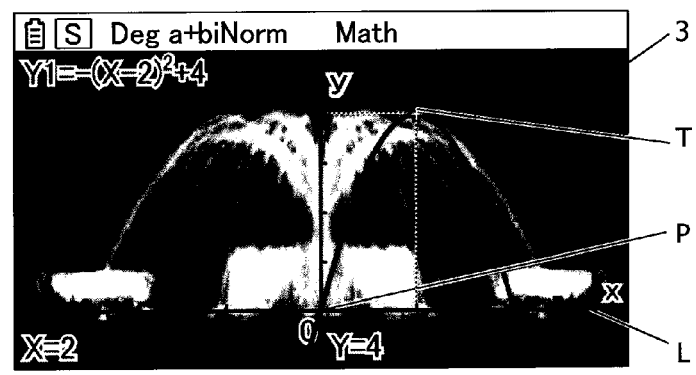
Figure 11D:
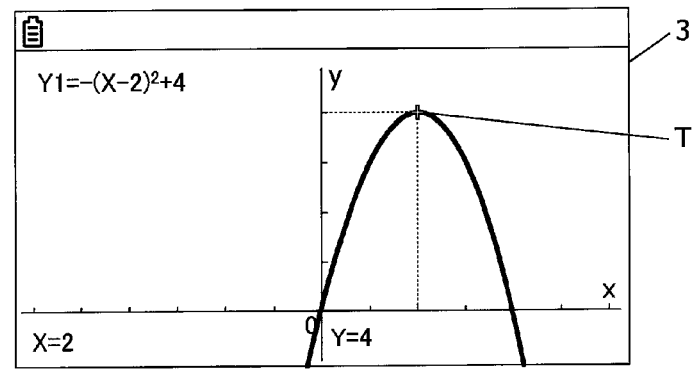

When the user performs an operation of tracing a point on the graph (step T10; Yes), an X-coordinate value about the trace pointer T to be displayed is set to "0" (step T11), the trace pointer T is displayed on a corresponding point of the X-coordinate value "0", and the X and Y coordinates of the trace pointer T are displayed on the lower part of the display 3 (step T12). When the user performs an operation of moving the trace pointer T to the right a plurality of times (step T13; Yes), as shown in FIG. 11C, the X coordinate value of the trace pointer T is increased to the right and set again (step T14). The trace pointer T is displayed on a corresponding point of a scale value "2" on the X axis, and the X and Y coordinates of the trace pointer T are displayed on the lower part of the display 3 (step T12). In this operation, a graph equation is displayed on the upper left of the display 3. At this time, when the user operates the "F6" key 26f, as shown in FIG. 11D, the display contents on the display 3 are switched to only the graph.

(Operation 2)

Figure 12A:
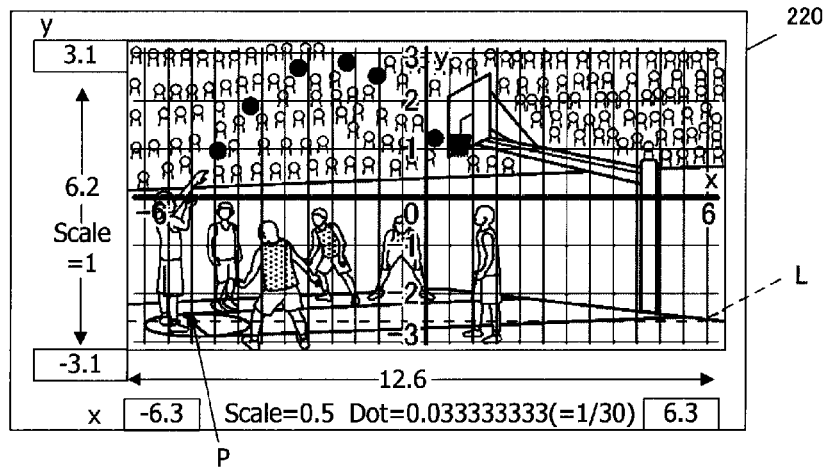
FIGS. 12A to 12C are diagrams showing display contents of the display.

When a user designates the image data 243 of the image data group 242 as the designated image data 243S in the personal computer 200 (step S1), as shown in FIG. 12A, the image of the designated image data 243S is displayed on the display 220 (step S2), and a display range of the coordinate system is set to a default value ("Xmin: −6.3", "Xmax: 6.3", "Ymin: −3.1", and "Ymax: 3.1") (step S3). In this operation, an image of the designated image data 243S is obtained by photographing free throw in a basketball game from the side. In the image, a ground position is the reference line L, and a foot position of a player is the reference point P.

When the user inputs the scale interval of the X axis and the scale interval of the Y axis as "Xscl: 0.5" and "Yscl: 1", respectively (step S4), the X and Y axes are displayed on the image of the designated image data 243S in the display range ("Xmin: −6.3", "Xmax: 6.3", "Ymin: −3.1", and "Ymax: 3.1") set at present, scales are displayed on the coordinate axes at the input scale intervals "Xscl: 0.5" and "Yscl: 1", and X-axis and Y-axis values at the end portions of the image (X-axis values "3.1" and "−3.1" at horizontal ends of the image, Y-axis values "6.3" and "−6.3" at vertical ends), and scale intervals "0.5" (Xscl) and "1" (Yscl) are displayed in an external region of the image (step S5). At this time, a dot interval (X dot) in the X-axis direction is calculated as "0.033 . . ." (=1/30) and displayed in the external region of the image.

Of the combinations (Xmin, Xmax, Ymin, and Ymax) of the upper-limit values and the lower-limit values in the coordinate range storing table 241, combinations (all combinations in FIG. 3A in this operation) which can locate the scales of the X axis on the dots of the display 3 at scale intervals "Xscl: 0.5" input in step S4 are read (step S6).

Figure 12B:
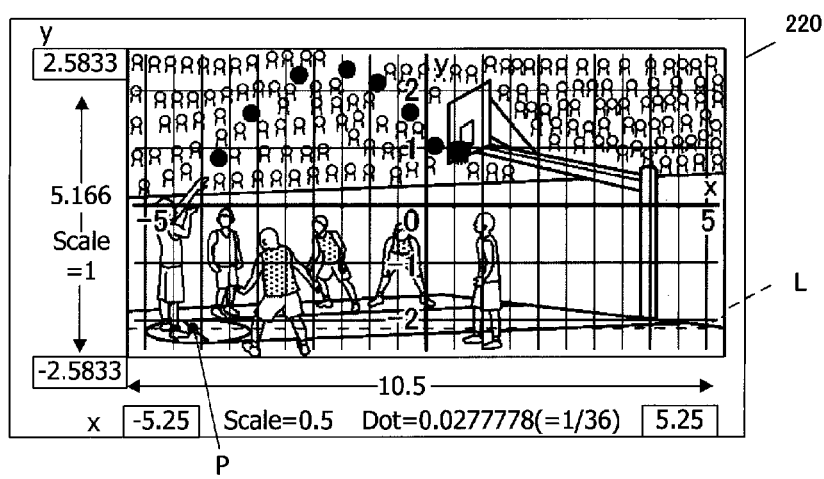

When the user performs a zooming operation (step S7; Yes), while the image of the designated image data 243S is directly displayed on the display 220, of the combinations (Xmin, Xmax, Ymin, and Ymax) of the upper-limit values and the lower-limit values of the X and Y axes read in step S6, a combination ("Xmin: −5.25", "Xmax: 5.25", "Ymin: −2.5833", and "Ymax: 2.5833"; the third from the bottom in FIG. 3A) corresponding to the zooming operation is set as a display range of the coordinate system again (step S8). As shown in FIG. 12B, the X and Y axes are displayed on the image of the designated image data 243S in the display range ("Xmin: −5.25", "Xmax: 5.25", "Ymin: −2.5833", and "Ymax: 2.5833") set at present, scales are displayed on the coordinate axes at the input scale intervals "Xscl: 0.5" and "Yscl: 1", and X-axis and Y-axis values at the ends of the image (X-axis values "5.25" and "−5.25" at the horizontal ends of the image and Y-axis values "2.5833" and "−2.5833" at the vertical ends) and the input scale intervals "0.5" (Xscl) and "1" (Yscl) are displayed in the external region of the image (step S5). At this time, a dot interval (X dot) in the X-axis direction is calculated as "0.0277 . . ." (=1/36) and displayed in the external region of the image.

Figure 12C:
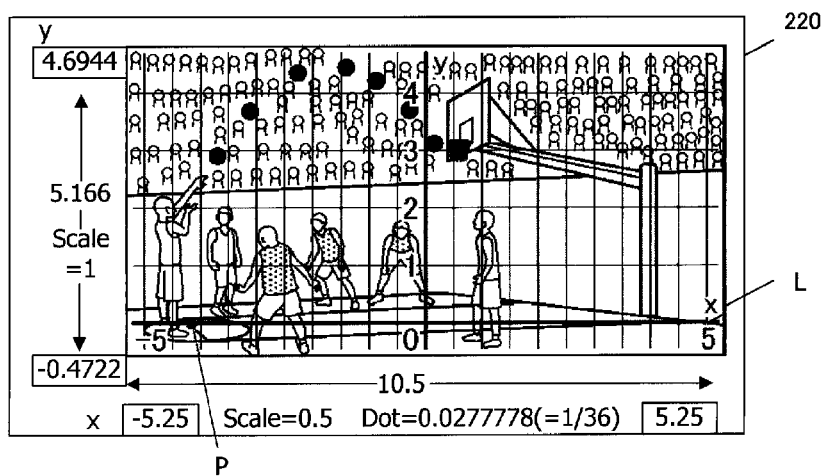

When the user performs a moving operation in the lower direction in such a way that the X axis is matched with the reference line L of the image (step S9; Yes), the display range of the X-Y coordinate system is moved in the lower direction, and the display range (Xmin, Xmax, Ymin, and Ymax) of the coordinate system is set again (step S10). As shown in FIG. 12C, the X and Y axes are displayed on the image of the designated image data 243S in a display range ("Xmin: −5.25", "Xmax: 5.25", "Ymin: −0.4722", and "Ymax: 4.6944") set at present, scales are displayed on the coordinate axes at the input scale intervals "Xscl: 0.5" and "Yscl: 1", and X-axis and Y-axis values at the ends of the image (X-axis values "5.25" and "−5.25" at the horizontal ends of the image and Y-axis values "4.6944" and "−0.4722" at the vertical ends) and the input scale intervals "0.5" (Xscl) and "1" (Yscl) are displayed in the external region of the image (step S5). At this time, the dot interval (X dot) in the X-axis direction is calculated as "0.0277 . . ." (=1/36) and displayed in the external region of the image.

Figure 13A:
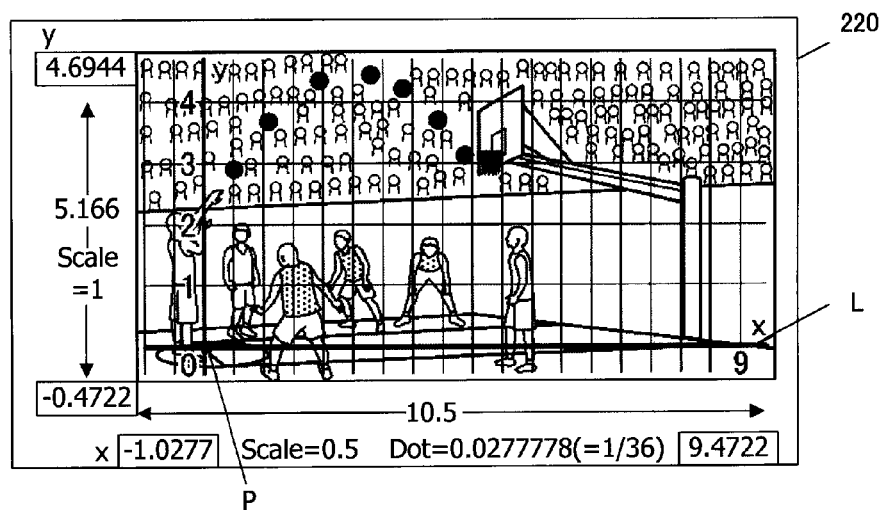
FIGS. 13A and 13B are diagrams showing display contents of the display.

When the user performs a moving operation to the right in such a way that the origin is matched with the reference point P of the image (step S9; Yes), the display range of the X-Y coordinate system is moved to the right, and the display range (Xmin, Xmax, Ymin, and Ymax) of the coordinate system is set again (step S10). As shown in FIG. 13A, the X and Y axes are displayed on the image of the designated image data 243S in a display range ("Xmin: −1.0277", "Xmax: 9.4722", "Ymin: −0.4722", and "Ymax: 4.6944") set at present, scales are displayed on the coordinate axes at the input scale intervals "Xscl: 0.5" and "Yscl: 1", and X-axis and Y-axis values at the ends of the image (X-axis values "9.4722" and "−1.0277" at the horizontal ends of the image and Y-axis values "4.6944" and "−0.4722" at the vertical ends) and the input scale intervals "0.5" (Xscl) and "1" (Yscl) are displayed in the external region of the image (step S5). At this time, the dot interval (X dot) in the X-axis direction is calculated as "0.0277 . . . " (=1/36) and displayed in the external region of the image.

Figure 13B:
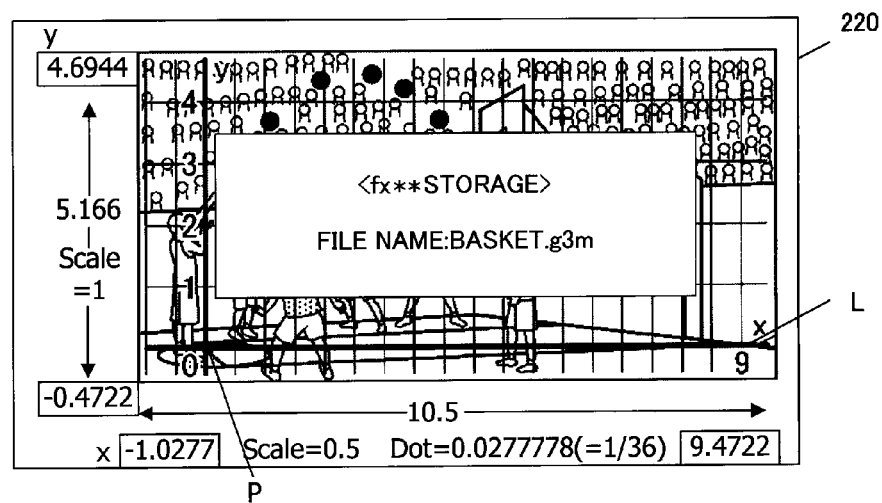

As shown in FIG. 13B, the user performs a storing operation (step S11; Yes) and inputs a file name "BASKET" (step S12), and the display range ("Xmin: −1.0277", "Xmax: 9.4722", "Ymin: −0.4722", and "Ymax: 4.6944") of the coordinate system and the scale intervals "Xscl: 0.5" and "Yscl: 1" are added to the designated image data 243S as the additional data 246 to form the image file 245. The image file 245 is stored in the flash ROM 204 in association with the input file name "BASKET" (step S13).

Figure 14A:
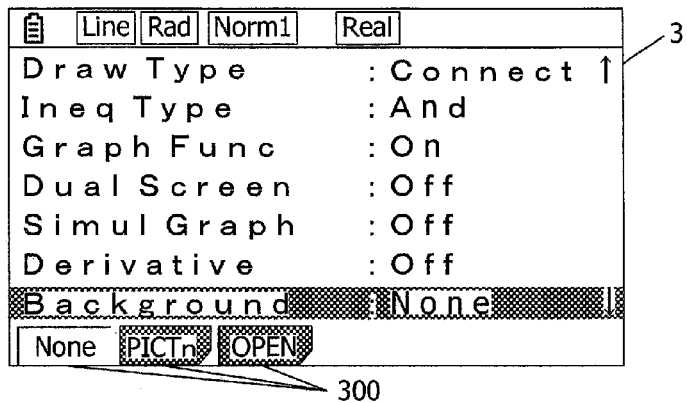
FIGS. 14A to 14D are diagrams showing display contents of the display.
Figure 14B:
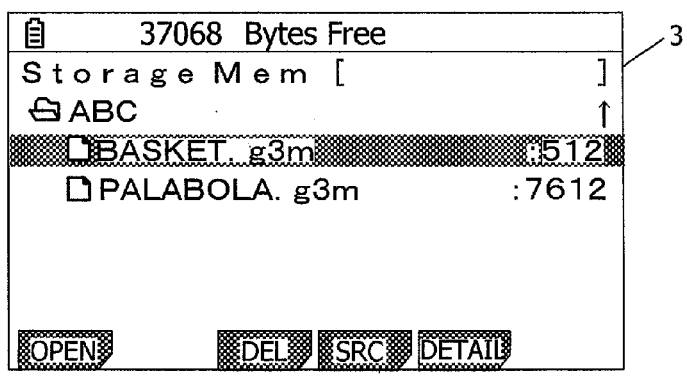
Figure 14C:
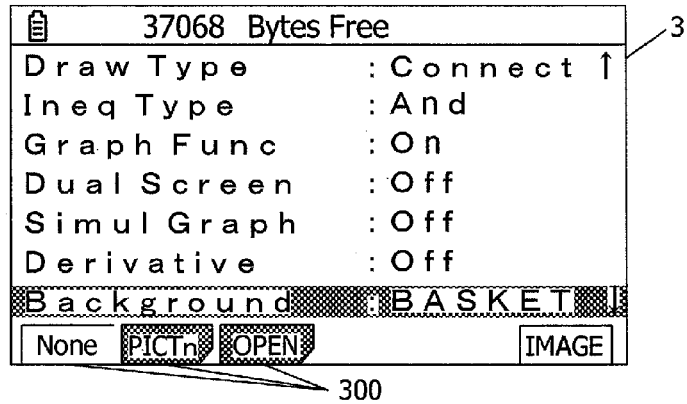
Figure 14D:
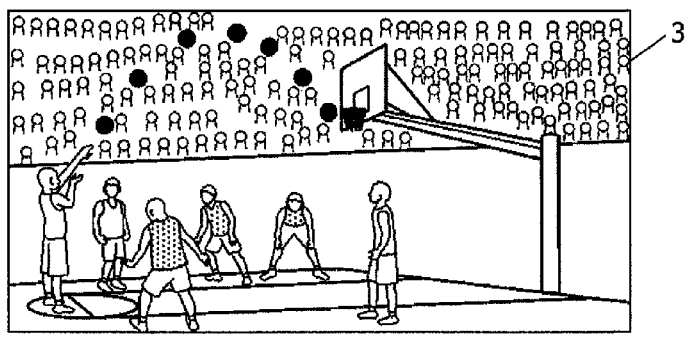

After the image file 245 is stored in the storing unit 13 through the communication unit 16, as shown in FIGS. 14A to 14D, when the user designates the image file 245 of the file name "BASKET" as a background image in the scientific electronic calculator 1 (step T1), the image of the image file 245 is displayed on the display 3 (step T2). In FIG. 14B, a state in which "OPEN" is selected in the state in FIG. 14A is shown, so that the image file 245 can be selected by a file name.

Figure 15A:
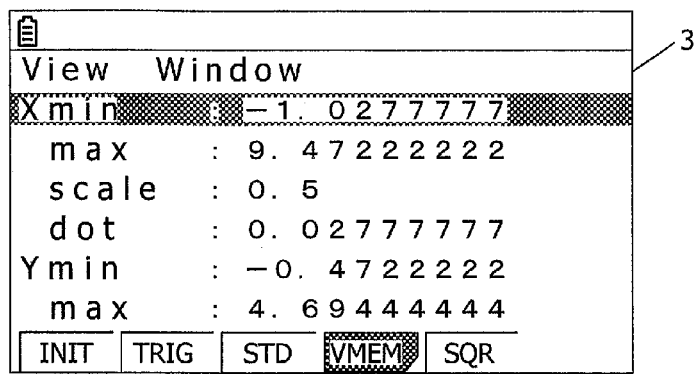
FIGS. 15A and 15B are diagrams showing display contents of the display.
Figure 15B:
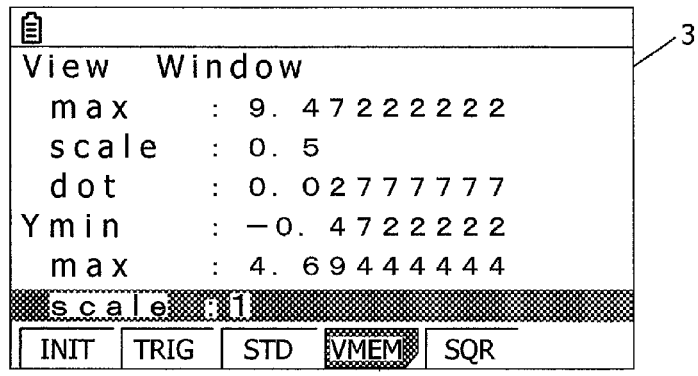

When the user performs an operation of setting the additional data 246 added to the image file 245 as the view window information (step T3; Yes), as shown in FIGS. 15A and 15B, the contents of the additional data 246 added to the image file 245, i.e., the display range ("Xmin: −1.0277", "Xmax: 9.4722", "Ymin: −0.4722", and "Ymax: 4.6944") of the coordinate system, the scale intervals "Xscl: 0.5" and "Yscl: 1", and the dot interval "0.027, . . . " in the X-axis direction calculated from these values are set as the view window information, and the information in the view window information storing region 121 is updated (step T4).

Figure 16A:
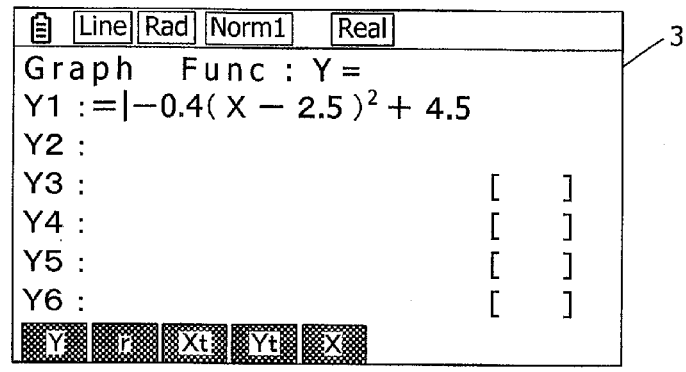
FIGS. 16A to 16C are diagrams showing display contents of the display.
Figure 16B:
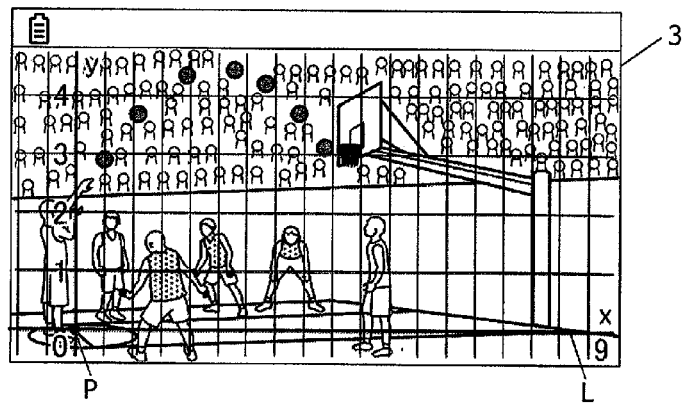
Figure 16C:
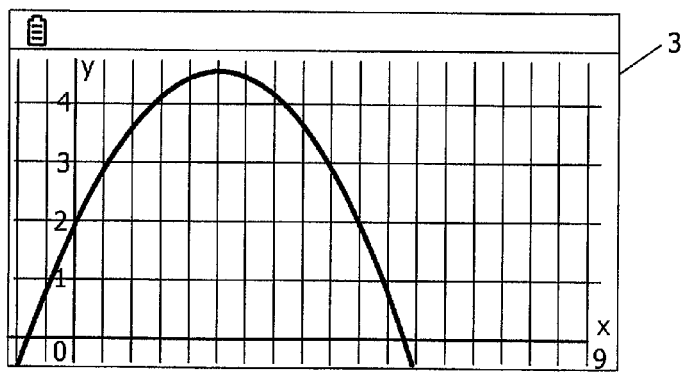

The user sets up the display mode in such a way that "Axes" (X and Y axes) is set to "scale" (coordinate axes are displayed with scales), "Label" (coordinate axis names of the X and Y axes and "0" of the origin position) is set to "on" (displayed), and "Grid" (grid) is set to "on" (grid is displayed) (step T7). At this time, as shown in FIG. 16A, when a graph equation "Y=−0.4(X−2.5)2+4.5" is input (step T8), as shown in FIG. 16B, the image of the image file 245 is displayed on the background, the X and Y axes and scales of the axes are displayed based on the view window information in the view window information storing region 121 and the contents of the setup of the display mode, and a graph of the graph equation "Y=−0.4(X−2.5)2+4.5" is displayed on the coordinate system determined by the X and Y axes (step T9). At this time, when the user operates the "F6" key 26f, as shown in FIG. 16C, the display contents on the display 3 are switched to only the graph.

In this case, in the view window information, since the numerical width "10.4999" (=Xmax−Xmin=9.4722−(−1.0277)) of the X axis is set in such a way that a value obtained by dividing the numerical width (Xmax−Xmin) of the X axis by the scale interval "Xscl: 0.5" is one N-th (here, the N is an integer) of the number "378" of dots in the X-axis direction, the scales of the X axis are located on the dots of the display 3. Since a display range ("Xmin: −1.0277", "Xmax: 9.4722", "Ymin: −0.4722", and "Ymax: 4.6944") are set in such a way that the reference line L of the image of the image file 245 is matched with the X axis and the reference point P of the image is matched with the origin of the coordinate system, on the X-Y coordinate system which the image of the image data 243 is superposed on, the reference line L is matched with the X axis, and the reference point P is matched with the origin.

Figure 17A:
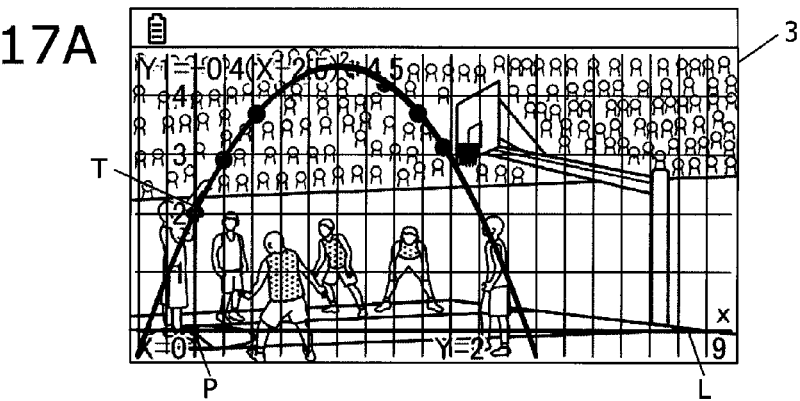
FIGS. 17A to 17D are diagrams showing display contents of the display.
Figure 17B:
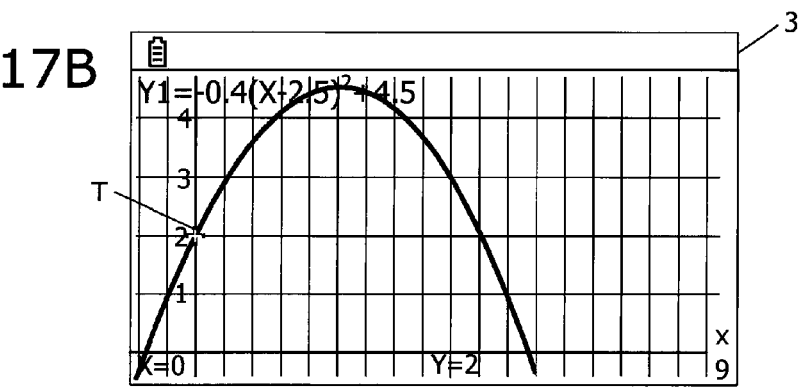

When the user performs an operation of tracing a point on the graph (step T10; Yes), an X-coordinate value about the trace pointer T to be displayed is set to "0" (step T11), the trace pointer T is displayed on a corresponding point of the X-coordinate value "0" as shown in FIG. 17A, and the X and Y coordinates of the trace pointer T are displayed on the lower part of the display 3 (step T12). In this operation, at this time, a graph equation is displayed on the upper left of the display 3. At this time, when the user operates the "F6" key 26f, as shown in FIG. 17B, the display contents on the display 3 are switched to only the graph.

Figure 17C:
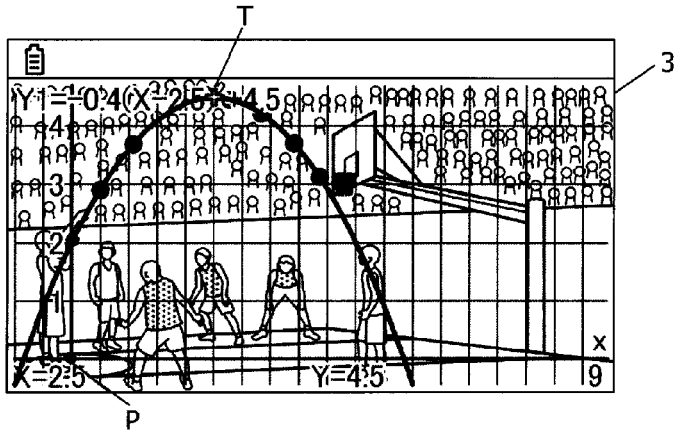
Figure 17D:
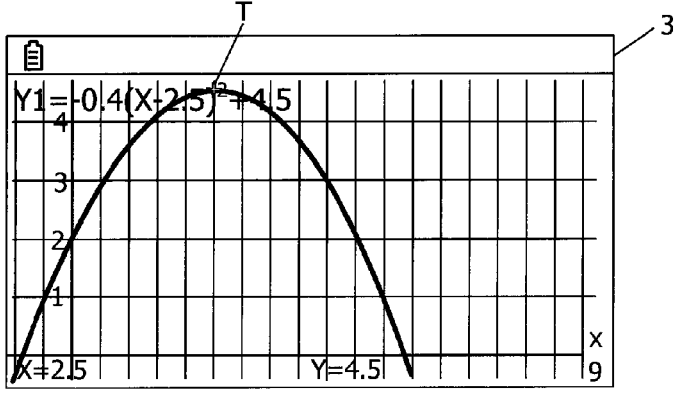

When the user performs an operation of moving the trace pointer T to the right a plurality of times (step T13; Yes), as shown in FIG. 17C, the X-coordinate value of the trace pointer T is increased to the right and set again (step T14). The trace pointer T is displayed on a corresponding point of a scale value "2.5" on the X axis, and the X and Y coordinates of the trace pointer T are displayed on the lower part of the display 3 (step T12). At this time, when the user operates the "F6" key 26f, as shown in FIG. 17D, the display contents on the display 3 are switched to only the graph.

According to this embodiment, as described in steps T10 to T14 in FIG. 7, FIG. 11C, FIGS. 17A to 17D, and the like, while the trace pointer T is displayed on the graph of the X-Y coordinate system determined by the X and Y axes, the trace pointer T is moved on the graph according to a user operation, and the coordinate values of the trace pointer T are displayed. For this reason, the trace pointer T is displayed at an optional point on the graph to make it possible to display the position coordinates of the trace pointer T.

As described in steps T3, T4, and T9 to T14 in FIG. 7, FIG. 11C, FIGS. 17A to 17D, and the like, scales are displayed on the X axis at the predetermined scale intervals (Xscl), and the trace pointer T moves on the graph dot by dot in the X-axis direction according to a user operation. The numerical width (Xmax−Xmin) of the X axis is set in such a way that a value obtained by dividing the numerical width (Xmax−Xmin) of the X axis by the scale interval (Xscl) is one N-th (here, the N is an integer) of the number of dots in the X-axis direction, and the X axis is displayed. For this reason, each space between the scales in the X-axis direction can be expressed by an integer number of dots. Consequently, the coordinate values of the trace pointer T can be more accurately matched with a scale value. Therefore, when the X-axis coordinate value of the trace pointer T is matched with the scale value, a correct value on the Y axis can be obtained.

As described in steps S9 and S10 in FIG. 6, step T9 in FIG. 7, FIGS. 11A to 11D, FIGS. 16A to 17D, and the like, the additional data 246 showing a display range of the Y axis to be associated with the image is added to the image data 243, and the additional data 246 is set in such a way that the reference line L of the image is matched with the X axis. For this reason, the reference line L in the image is matched with the X axis to make it possible to display the image as a background of the X-Y coordinate system.

As described in steps S9 and S10 in FIG. 6, step T9 in FIG. 7, FIGS. 11A to 11D, FIGS. 16A to 17D, and the like, the additional data 246 showing a display range of the X and Y axes, to display range which corresponds to an image is added to the image data 243, and the additional data 246 is set in such a way that the reference point P of the image is matched with an origin. For this reason, the reference point P in the image is matched with the origin to make it possible to display the image as a background of the X-Y coordinate system.

Detailed configurations and detailed operations of the constituent elements of the scientific electronic calculator 1 according to this embodiment can be appropriately changed without departing from the scope of the invention as a matter of course.

For example, the graph display apparatus according to the present invention has been explained as the scientific electronic calculator 1. However, the present invention can be applied not only to such a product but also to general electronic appliances such as a mobile phone, a personal computer, a PDA (Personal Digital Assistant), and a game machine. The function graph display program 130 according to the present invention may be stored in a memory card, a CD, or the like which is detachably attached to the scientific electronic calculator 1.

The above explanation has been made on the assumption that the function graph display process is performed in the personal computer 200. However, the function graph display process may be performed in the scientific electronic calculator 1 by executing the function graph display program 130.

The scientific electronic calculator 1 has been explained to receive the image file 245 from the personal computer 200 through the communication unit 16. However, the scientific electronic calculator 1 may be designed to receive the image file 245 through the recording medium reading unit 17.

The explanation has been made on the assumption that an image of the image data 243 is displayed as a background in the process in step T9 and a coordinate system determined by X and Y axes is displayed on the front side of the image. However, as long as both the contents can be visually checked, the being superposed on order may be reversed.

The explanation has been made on the assumption that the vertical axis and the horizontal axis of a coordinate system are defined as a Y axis and an X axis, respectively. However, other coordinate axis names may be used. Furthermore, in the explanation, the coordinate system is defined as an orthogonal coordinate system. However, a coordinate system of another type such as an oblique coordinate system or a polar coordinate system may be used.

The explanation has been made on the assumption that a user inputs a graph equation through the input key group 2 in the process in step T8. However, the graph may be input through the touch panel 30.

All of the disclosures including the description, the claims, the drawings, and the abstract of Japanese Patent Application No. 2010-069349, filed on Mar. 25, 2010, are incorporated herein by reference.

Although various typical embodiments have been exemplified and described, the scope of the present invention is not limited to the matters of the embodiments described above. Consequently, the scope of the present invention is limited only by the following claims.

What is claimed is:

1. A graph display apparatus comprising:
a display range storage unit which stores a display range including an upper-limit value and a lower-limit value in a horizontal axis direction and a vertical axis direction of a graph;
an image file specifying unit which specifies image data of an image file as a background, wherein the image data of the image file includes a reference line of a horizontal position, and the image file includes additional data including a display range, the display range being set so that when an image of the image data is displayed superposed on a coordinate axis, the reference line matches with the coordinate axis in the horizontal axis direction;
a display range setting unit which sets the display range of the additional data of the image file in the display range storage unit; and
a graph display control unit which displays a graph so that the reference line is matched with the coordinate axis in the horizontal axis direction of the set display range.

2. The graph display apparatus according to claim 1, further comprising a coordinate value display control unit which designates a position on the graph according to a user operation and displays a coordinate value of the position.

3. The graph display apparatus according to claim 1, further comprising a communication unit which receives the image file from an external device to store the image file in a file storage unit.

4. A graph display apparatus comprising:
a display range storage unit which stores a display range including an upper-limit value and a lower-limit value in a horizontal axis direction and a vertical axis direction of a graph;
an image file specifying unit which specifies image data of an image file as a background, wherein the image data of the image file includes a specified image of a reference point, and the image file includes additional data including a display range, the display range being set so that when an image of the image data is displayed superposed on a coordinate axis, the specified image of the reference point matches with an origin of the coordinate axis;
a display range setting unit which sets the display range of the additional data of the image file in the display range storage unit; and
a graph display control unit which displays a graph so that the specified image of the reference point is matched with the origin of the coordinate axis of the set display range.

5. A non-transitory computer-readable storage medium storing a computer-executable control program which controls a computer in a graph display apparatus, which comprises a display range storage unit which stores a display range including an upper-limit value and a lower-limit value in a horizontal axis direction and a vertical axis direction of a graph, to perform functions comprising:
an image file specifying function which specifies image data of an image file as a background, wherein the image data of the image file includes a reference line of a horizontal position, and the image file includes additional data including a display range, the display range being set so that when an image of the image data is displayed superposed on a coordinate axis, the reference line matches with the coordinate axis in the horizontal axis direction;
a display range setting function which sets the display range of the additional data of the image file in the display range storage unit; and
a graph display control function which displays a graph so that the reference line is matched with the coordinate axis in the horizontal axis direction of the set display range.

6. A non-transitory computer-readable storage medium storing a computer-executable control program which controls a computer in a graph display apparatus, which comprises a display range storage unit which stores a display range including an upper-limit value and a lower-limit value in a horizontal axis direction and a vertical axis direction of a graph, to perform functions comprising:
an image file specifying function which specifies image data of an image file as a background, wherein the image data of the image file includes a specified image of a reference point, and the image file includes additional data including a display range, the display range being set so that when an image of the image data is displayed superposed on a coordinate axis, the specified image of the reference point matches with an origin of the coordinate axis;

a display range setting function which sets the display range of the additional data of the image file in the display range storage unit; and a graph display control function which displays a graph so that the specified image of the reference point is matched with the origin of the coordinates axis of the set display range.

* * * * *